(12) United States Patent
Roark

(10) Patent No.: US 7,021,142 B2
(45) Date of Patent: Apr. 4, 2006

(54) MOUNTABLE SOUND PRESSURE LEVEL METER

(76) Inventor: Richard S. Roark, 1333 Durham Rd., Clarksville, TN (US) 37043

(*) Notice: Subject to any disclaimer, the term of this patent is extended or adjusted under 35 U.S.C. 154(b) by 0 days.

(21) Appl. No.: 10/695,771

(22) Filed: Oct. 30, 2003

(65) Prior Publication Data

US 2004/0089071 A1 May 13, 2004

Related U.S. Application Data

(60) Provisional application No. 60/422,091, filed on Oct. 30, 2002.

(51) Int. Cl.
*G01M 17/00* (2006.01)
(52) U.S. Cl. .......................... 73/585; 73/587
(58) Field of Classification Search ................ 73/1.82, 73/570, 570.5, 579, 584, 585, 587, 589
See application file for complete search history.

(56) References Cited

U.S. PATENT DOCUMENTS

| | | |
|---|---|---|
| 2,671,134 A | 3/1954 | Chrystie |
| 2,891,217 A | 6/1959 | Grieg et al. |
| 2,969,530 A | 1/1961 | Duncan |
| 3,089,561 A | 5/1963 | Michael et al. |
| 3,304,368 A | 2/1967 | Ford et al. |
| 3,597,542 A | 8/1971 | Thornton |
| 3,844,175 A | 10/1974 | Hixson |
| 3,991,628 A | 11/1976 | Narita |
| 4,102,208 A | 7/1978 | Betz |
| 4,257,273 A | 3/1981 | Knowd |
| 4,277,980 A | 7/1981 | Coats et al. |
| 4,424,511 A | 1/1984 | Alberts, Jr. |
| 4,607,528 A | 8/1986 | Kallergis |
| 4,620,445 A | 11/1986 | McKendree et al. |
| 4,648,572 A * | 3/1987 | Sokol .................. 248/206.2 |
| 5,805,457 A | 9/1998 | Sanders |
| 6,101,882 A | 8/2000 | Tran et al. |
| 6,272,360 B1 * | 8/2001 | Yamaguchi et al. ..... 455/569.2 |
| 6,366,207 B1 * | 4/2002 | Murphy .................. 340/576 |
| 6,481,271 B1 | 11/2002 | Ward et al. |
| 6,836,238 B1 * | 12/2004 | Orr et al. ................. 342/174 |
| 2004/0246171 A1 * | 12/2004 | Orr et al. ................. 342/174 |
| 2005/0100169 A1 * | 5/2005 | Shelley et al. ............. 381/58 |

FOREIGN PATENT DOCUMENTS

| | | |
|---|---|---|
| JP | 55050122 | 4/1980 |
| JP | 07253377 | 10/1995 |
| JP | 2003065838 | 3/2003 |

* cited by examiner

*Primary Examiner*—Eric S. McCall
(74) *Attorney, Agent, or Firm*—Edell, Shapiro & Finnan, LLC

(57) ABSTRACT

A mountable sound pressure level (SPL) meter is described that includes a mechanism for mounting the SPL meter within an motor vehicle to measure motor vehicle audio system SPL values within the motor vehicle. The automotive SPL meter includes an internal microphone, or pressure sensor, that is designed for automotive use. Such pressure sensor improvements may include: use of a thicker and highly durable polytetrafluoroethylene (PTFE) microphone/pressure sensor diaphragm; use of a thicker, non-conducting gasket to increase microphone/pressure sensor excursion capability; use of a reduced number of microphone/pressure sensor back plate holes; and/or, reducing the diameter of microphone/pressure sensor back plate holes. The automotive SPL meter is highly resistant to operational environment temperature, humidity and decibel level extremes without sacrificing accuracy. A programmable micro-controller is used to increase design flexibility, and reduce the SPL meter discrete component count, thereby increasing reliability while reducing SPL meter physical size and production costs.

38 Claims, 9 Drawing Sheets

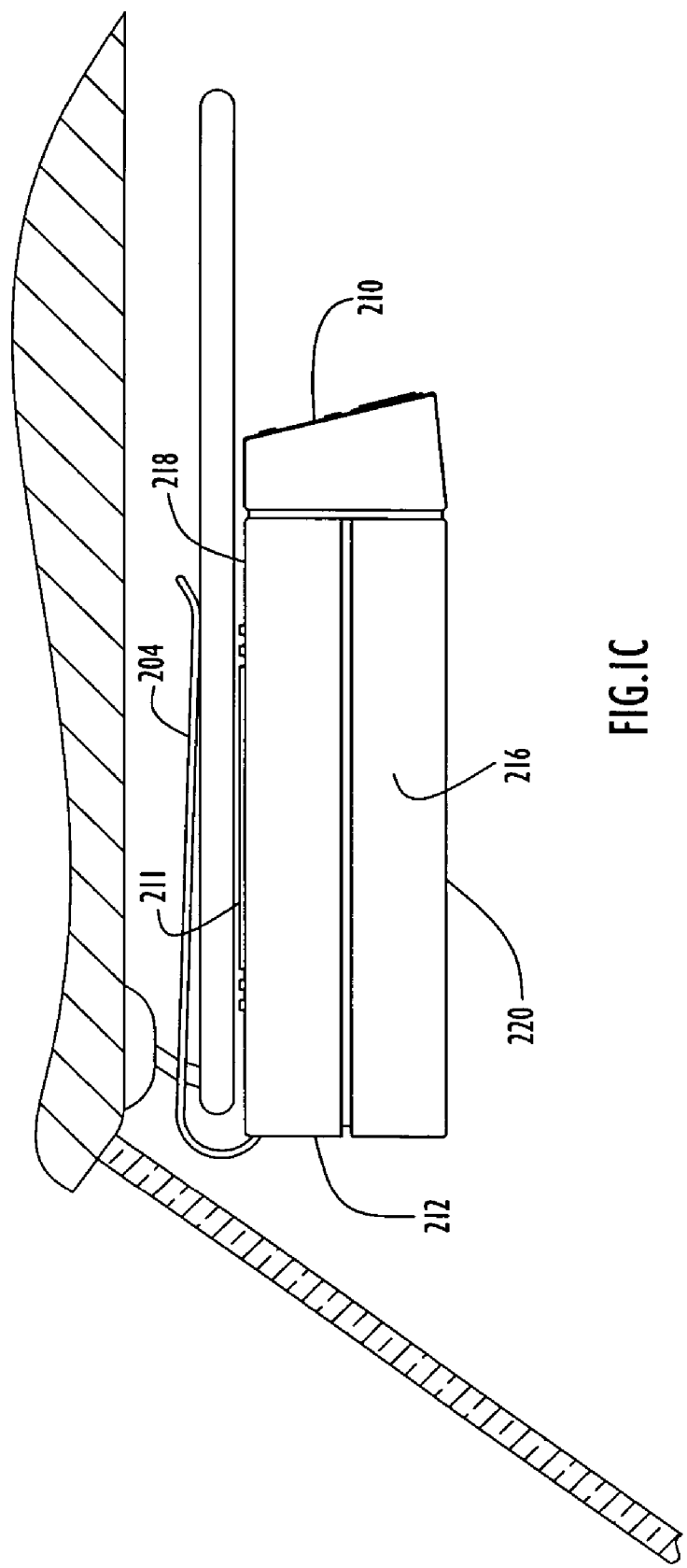

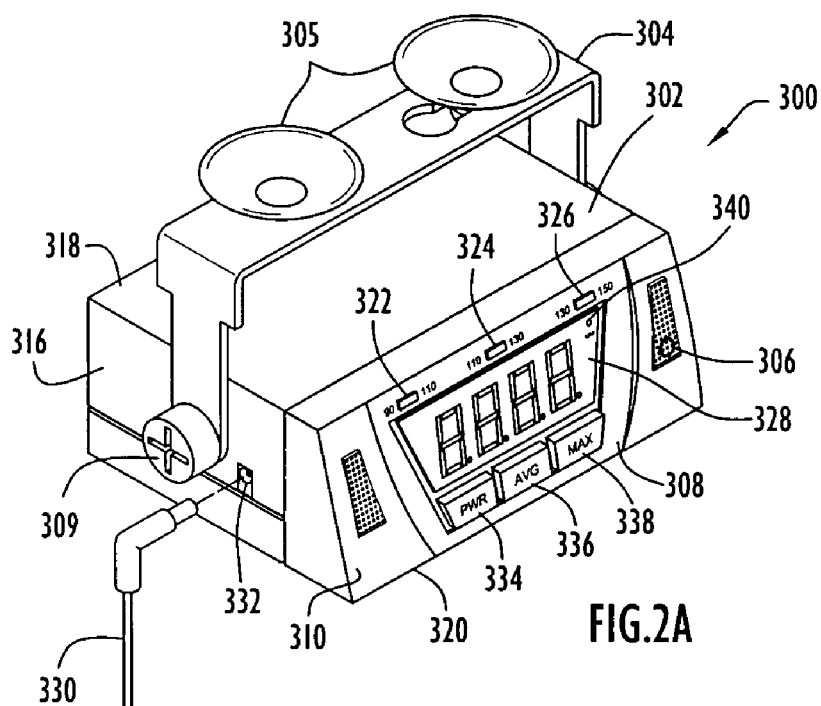
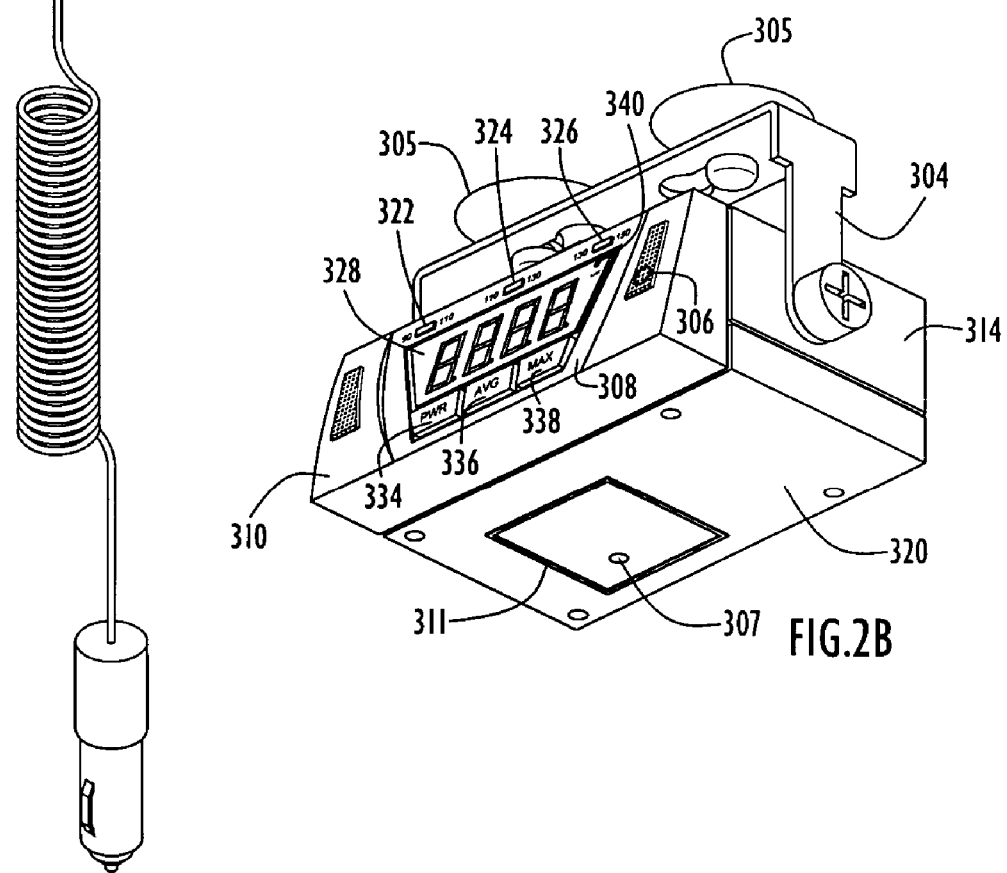

MOUNTABLE SOUND PRESSURE LEVEL METER

CROSS-REFERENCE TO RELATED APPLICATIONS

This application claims priority from U.S. Provisional Patent Application Ser. No. 60/422,091, entitled "Mountable Sound Pressure Level Meter" and filed Oct. 30, 2002, the disclosure of which is incorporated herein by reference in its entirety.

BACKGROUND OF THE INVENTION

1. Field of the Invention

The present invention pertains to sound pressure level meters. In particular, the present invention pertains to a temporarily mountable automotive sound pressure level meter for use in measuring and comparing measured sound pressure level readings.

2. Description of the Related Art

Sound pressure level (SPL) meters are devices used to measure the magnitude of acoustic energy, or sound. Typically SPL meters generate a measure, or SPL reading, of sound in decibels. Conventional SPL meters can be used to measure a variety of acoustic events. For example, an airport authority may use an SPL meter to measure the decibel levels reached in neighborhoods surrounding an airport during the take-off/landing of commercial aircraft; a factory manager may use an SPL meter to assure that decibel levels on a plant floor are within government mandated safety limits; or an acoustics engineer may use an SPL meter to assess the propagation of sound within a theater or amphitheater. Further, SPL meters are commonly operated at drag-car races to measure the sound pressure levels generated by high performance dragsters during competition or to measure the sound pressure levels generated by a cheering crowd in a stadium. In recent years, due to the growing popularity of high performance automobile audio systems, SPL meters are also commonly used to conduct automobile audio system SPL competitions. When used to conduct an SPL competition, an SPL meter is used to measure a maximum SPL reading from each of the respective competitors. Competition officials typically observe the maximum SPL reading produced and manually identify a new maximum reading. The competitor whose vehicle achieves the highest SPL reading is declared the winner.

Unfortunately, many conventional SPL meters are not well suited for supporting automotive audio system SPL competitions. For example, to conduct a fair automotive audio system SPL competition, SPL meters not only have to be consistently accurate, they must be capable of being mounted within the respective competing vehicles in a consistent manner. One conventional SPL meter typically used in automotive audio SPL competition includes an SPL meter chassis and an external microphone that is connected to the SPL meter chassis via a cable. Other conventional SPL meters include microphones that protrude significantly from the SPL meter body. Such conventional SPL meters are not easily mountable within an automobile due to the presence of the external microphone cable or protruding microphone, respectively.

SPL meters are typically sensitive pieces of electronic equipment that are easily damaged by rough handling and severe operating environments. Such characteristics greatly diminish the suitability of many conventional SPL meters for use in automotive audio SPL competitions and/or for prolonged use in monitoring SPL levels in individual vehicles due to the environment extremes that are typically experienced by vehicle interiors and the constant handling of the SPL meter as the meter is moved from vehicle to vehicle in SPL competitions. Further temperature and humidity extremes can affect the accuracy of conventional SPL meters that have not been hardened for use under such conditions.

Another drawback to conventional SPL meters is their overall complexity due to capabilities and features that are not needed for SPL vehicle competitions and/or for monitoring sound pressure levels in a personal vehicle. Such complexity typically manifests itself in an overly complex set of optional parameters, an overly complex set of operating procedures, and/or an overly complex output display that is difficult to read/interpret due to the large amount of information presented. For example, a number of conventional SPL meters use liquid crystal displays. Although liquid crystal displays are configurable to present a wide range of information, such displays are also difficult to read in direct or indirect sunlight and are therefore difficult to use in outdoor automotive competitions and are also difficult to use within a single automobile to monitor audio system SPL levels.

Ironically, the same features and complexity that contribute to the inadequacy of conventional SPL meters for use in automotive audio SPL competitions and for vehicle SPL monitoring also increase the cost of such conventional SPL meters. The high cost of conventional SPL meters further inhibits the use of SPL meters by SPL competitors in preparation for a competition, by individuals interested in monitoring sound pressure levels within their vehicles, and/or by individuals interested in conducting their own ad-hoc amateur SPL competitions without investing a significant amount of money for a conventional SPL meter that may likely be damaged by the intended use. Moreover, there are no commercially available self-contained SPL meters that are temporarily mountable within vehicles, such that acoustic competitions can be performed conveniently by temporarily mounting and removing an SPL meter from a plurality of vehicles.

Hence, a need remains for a cost effective, accurate and portable sound pressure level (SPL) meter that can be mounted within a vehicle to monitor interior sound pressure levels within a single vehicle and/or to measure and compare maximum sound pressure levels achieved within multiple vehicles in support of automobile audio system SPL competitions. Preferably, the SPL meter would be capable of being securely and unobtrusively mounted within a vehicle for temporary or prolonged use by individuals to monitor sound pressure levels in a single vehicle as well as capable of being quickly and easily mounted within competing SPL competition vehicles in a position that is consistent across competing vehicles. In addition, the SPL meter would be capable of withstanding prolonged and/or repeated exposure to high decibel levels and would withstand being stored and/or operated under varied operating environments including low/high humidity and low/high temperature conditions. Furthermore, the SPL meter should be easy to operate regardless of whether the SPL meter is used to monitor sound pressure levels in a single vehicle or used to conduct a SPL competition involving many contestants and should provide ergonomic viewing of measured results via a clear, intuitive display.

SUMMARY OF THE INVENTION

Therefore, in light of the above, and for other reasons that will become apparent when the invention is fully described, an object of the present invention is to streamline SPL meter features and operation for use in automotive audio SPL meter competitions and monitoring of automotive audio SPL readings.

Another object of the present invention is to facilitate the mounting an SPL meter in a secure and consistent manner within a variety of motor vehicles (e.g., automobiles, pickup trucks, etc).

Still another object of the present invention is to improve the durability of an SPL meter to temperature, humidity and prolonged exposure to high decibel acoustical stimuli.

Yet another object of the present invention is reduce the cost of an SPL meter without diminishing the accuracy of the SPL meter for use in making automotive audio system SPL measurements.

Still yet another object of the present invention is to present SPL meter display output in a manner that is ergonomically compatible with automotive audio SPL meter competitions and monitoring of automotive audio SPL readings.

The aforesaid objects are achieved individually and in combination, and it is not intended that the present invention be construed as requiring two or more of the objects to be combined unless expressly required by the claims attached hereto.

In accordance with the present invention, an automotive sound pressure level (SPL) meter is described that is designed for use in measuring, monitoring and/or comparing audio system sound pressure levels within motor vehicles.

In one representative embodiment, the automotive SPL meter of the present invention includes an integrated bracket or clip that allows the SPL meter to be quickly and securely mounted to the underside of an automobile windshield visor. In another representative embodiment, the SPL meter includes an adjustable pivotal bracket with suction cups that allows the SPL meter to be quickly and securely mounted at multiple locations within an automobile or other motorized vehicle, for example, between the interior surface of an automobile windshield and the automobile dashboard.

Preferably, the automotive SPL meter includes an internal pressure sensor (e.g., a microphone), that is configured for use in measuring automotive audio system SPL values. Pressure sensor changes may include: use of a thicker and highly durable polytetrafluoroethylene (PTFE) pressure sensor diaphragm (e.g., typically between 0.005 millimeter and 0.015 millimeter thick; use of a thicker, non-conducting gasket to increase pressure sensor excursion capability (e.g., typically between 0.1 millimeter and 0.2 millimeter thick); use of a reduced number of pressure sensor back plate holes (e.g., reducing the number of back plate holes from three to two); and, reducing the diameter of pressure sensor back plate holes (e.g., reducing the diameter to between 0.9 millimeter and 1.3 millimeter). Use of such an pressure sensor results in an SPL meter that is highly resistant to operational environment temperature and humidity extremes typically encountered in automotive environments and an SPL meter that is unaffected by repeated and/or prolonged exposure to high decibel levels, yet sufficiently sensitive to accurately monitor automotive audio system SPL values.

Preferably, the automotive SPL meter of the present invention executes the majority of SPL functionality in the digital domain to reduce the number of internal electronic components and to minimize errors caused by the non-linear characteristics of more common analog devices. In this manner, software executed within a programmable controller can be used to correct identified problems rather than numerous analog electronic components. For example, an 8-bit RISC micro-controller within the SPL circuitry can be programmed for multiple processing purposes. Such a digital, central process based design increases design flexibility and reduces the number of discrete components within the SPL meter's internal circuitry, thereby reducing SPL meter production costs as well as reducing the required size of the SPL meter body.

Ideally, the automotive SPL meter of the present invention supports several modes of operation which may include but are not limited to a manual mode, an auto-ranging mode and a maximum value mode. Each mode provides an operational user with varying levels of control over the SPL value information presented to the user via the SPL meter display. For example, in maximum mode, an SPL meter displays only the highest SPL value measured. In one embodiment, the maximum SPL value is stored to non-volatile memory upon powering down the SPL meter and the SPL meter returns to maximum mode and re-displays the previously stored maximum SPL value upon power being restored to the device. Such an operating mode is ideal for use in automotive audio system SPL competitions to compare maximum SPL values generated by the respective competition vehicles.

Using the apparatus and methods described here, a cost effective automotive sound pressure level (SPL) meter is achieved that is designed for use in measuring, monitoring and/or comparing automotive audio system sound pressure levels in automotive audio system SPL competitions. The automotive SPL meter of the present invention is ideal for use by SPL competitors in preparation for a competition, by individuals interested in monitoring sound pressure levels within their vehicles, and/or by individuals interested in conducting their own ad-hoc amateur SPL competitions, without investing a significant amount of money for a conventional SPL meter that may likely be damaged by the intended use.

The above and still further objects, features and advantages of the present invention will become apparent upon consideration of the following descriptions and descriptive figures of specific embodiments thereof. While these descriptions go into specific details of the invention, it should be understood that variations may and do exist and would be apparent to those skilled in the art based on the descriptions herein.

BRIEF DESCRIPTION OF THE DRAWINGS

FIG. 1C is a side perspective view, from the same level, of the SPL meter shown in FIG. 1A that shows the SPL meter mounted to an automobile sun visor.

FIG. 2A is a front perspective view, from above, of a second representative SPL meter in accordance with an exemplary embodiment of the present invention.

FIG. 2B is a front perspective view, from below, of the SPL meter shown in FIG. 2A.

DESCRIPTION OF THE PREFERRED EMBODIMENTS

Figure 1A:
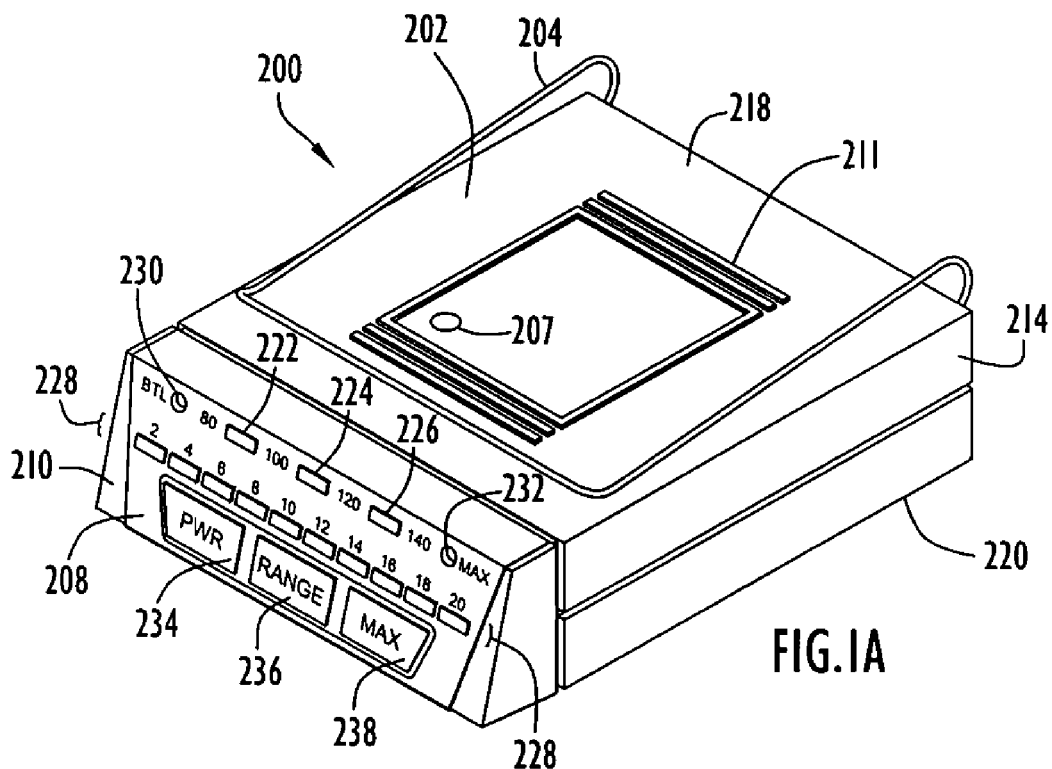
FIG. 1A is a front perspective view, from above, of a first representative SPL meter in accordance with an exemplary embodiment of the present invention.

Preferred embodiments according to the present invention are described below with reference to the above drawings, in which like reference numerals designate like components.

Figure 1B:
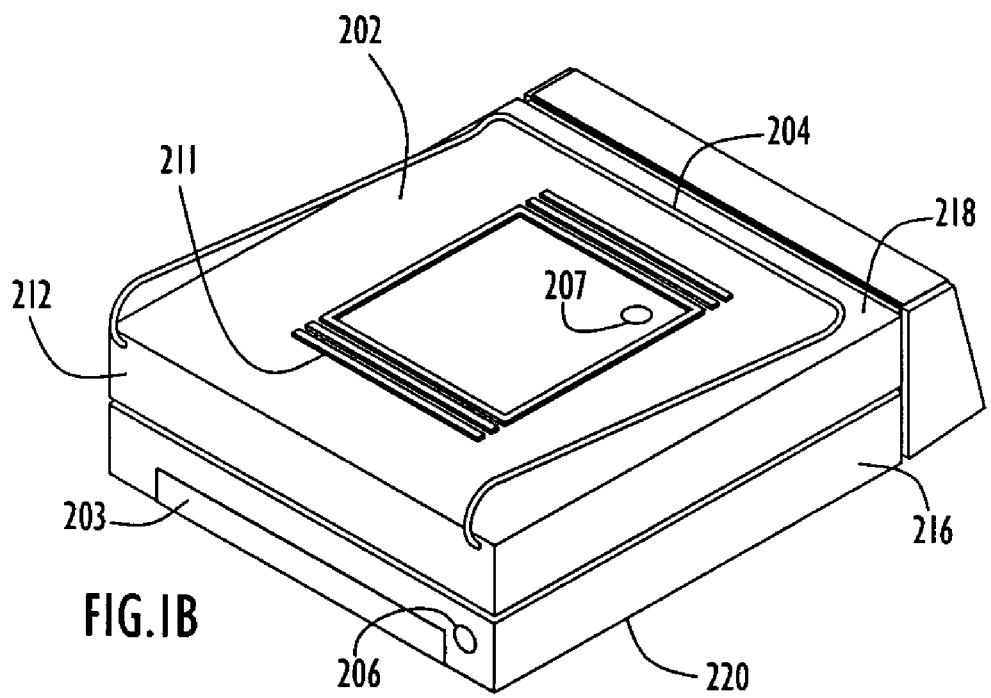
FIG. 1B is a rear perspective view, from above, of the SPL meter shown in FIG. 1A.

FIGS. 1A–C and FIGS. 2A–D are perspective views of an exemplary first and second embodiment, respectively, of an automotive SPL meter in accordance with the present invention that is configured/designed for use in measuring sound pressure levels within an automobile or other motorized vehicle. As used herein and in the claims, the term "automotive" is used in the general sense to refer to any type of motorized vehicle, not merely passenger cars. FIGS. 1A–C present a battery-operated SPL meter with an integrated mounting bracket that allows the SPL meter to be easily and securely mounted to the underside of an automobile windshield sun visor. FIGS. 2A–D present a externally-powered SPL meter with an adjustable mounting bracket that allows the SPL meter to be mounted with suction cups to any smooth surface within an automobile, such as the interior surface of an automobile windshield, and stabilized with support from an integrated, pivoting mounting bracket.

With respect to FIGS. 1A–1C, FIG. 1A presents a front perspective view, from above, of a battery-operated SPL meter 200 with an SPL meter body 202 and an integrated mounting bracket 204 that allows the SPL meter to be easily mounted upon a windshield sun visor of an automobile. The SPL meter of FIG. 2 includes an internal pressure sensor, such as a microphone, and an ergonomic user display/control interface 208.

SPL meter body 202 is essentially a box-shaped housing having a front face 210, a rear face (or "surface") 212, two opposing side surfaces (i.e., a left face 214 and a right face 216), a top face (surface) 218 and a bottom face (surface) 220. A display/control interface 208 is presented upon front face 210 and includes both a visual display and a control interface that is essentially a mode selector input device that allows an operator to select a mode of operation for the SPL meter (e.g., a "maximum" mode or a "continuous" mode) and generally controls the state of the display. Notably, front face 210 is considerably smaller than top and bottom surfaces 218 and 220, and somewhat smaller than side surfaces 214 and 216, such that the housing is slender and advantageously has a small, compact profile when viewed from the front. This overall shape contributes to usefulness of the SPL meter in an automotive context, since, when mounted in the vehicle, the user is presented with a clear, unobtrusive display and control panel that can easily be oriented to face toward the user. An integrated clip-like mounting bracket 204 is affixed to the rear face of SPL meter body 202 and extends above top face 218 to serve as a pressure clip against any object (e.g., a automotive windshield sun visor) that is inserted between integrated mounting bracket 204 and top face 218. Having a top surface that is relatively larger than the front, rear, and side surfaces increases the physical stability of the SPL meter, when mounted in such a manner, by providing an increased gripping area between the SPL top surface and integrated mounting bracket 204.

SPL body 202 houses components and circuitry for implementing SPL meter functions. In a preferred embodiment, internal components include an internal pressure sensor, such as a microphone, that has been specifically tailored for automotive use, as described below. The pressure sensor is mounted internally to avoid use of a projecting external microphone that is common in SPL meters not specifically adapted for automotive use as described below. A sound/pressure hole (or "aperture") in the rear face of SPL meter housing, shown in FIG. 1B at 206, allows sound to enter the SPL meter body and allow atmospheric pressures to equalize. An access hole in the top surface, shown in FIG. 1A at 207, allows the SPL meter to be adjusted/calibrated after assembly is complete. Further, as shown in FIG. 1B, SPL body 202 includes a battery access panel 203 that can be opened to replace an internally stored battery.

SPL meter 200 can be temporarily mounted to the underside of a windshield sun visor, as shown in FIG. 1C, by inserting the sun visor between integrated mounting bracket 204 and top face 218. Gripping ribs 211, provide increased hold between top face 218 and the sun visor.

When the visor is returned to its stowed position, the SPL meter 200 display/control interface 208 (on front face 210) faces towards and is visible to an occupant seated within the motor vehicle and sound/pressure hole 206 (on rear face 212) is positioned proximate to the automobile windshield. In this manner the SPL meter is in an ideal position for use in SPL competitions, as described above, and/or the SPL meter is conveniently placed for use in monitoring an audio system within a motor vehicle.

Display/control interface 208 provides an ergonomic display that is ideal for monitoring an audio system within a single vehicle and/or supporting an SPL competition. The display includes a range indicator that including three decibel-range indicators 222, 224, 226. The decibel-range indicators indicate minimum decibel SPL readings of 80 dB, 100 dB and 120 dB, respectively, when illuminated. It will be understood that the range indicator is not limited to this particular example, and any number of decibel-range indicators and range levels can be employed. For example, illumination of the 80 dB indicator 222 indicates an SPL reading that is at least 80 dB, but less than 100 dB. Illumination of the 100 dB indicator 224 indicates an SPL reading that is at least 100 dB, but less than 120 dB. Illumination of 120 dB indicator 226 indicates an SPL reading that is at least 120 dB, but less than 140 dB.

Further, the display includes a sub-range indicator, including a series of sub-range increment indicators 228, wherein each increment indicator represents a decibel increment to be added to the currently illuminated decibel-range indicator. The number of consecutive increment indicators illuminated indicates the decibel level within the decibel range specified by the range indicator. Given that the decibel-range indicators, described above, are in increments of 20 dB, each of the ten sub-range increment indicators shown in FIG. 1A represent a two decibel increase over the currently illuminated decibel-range indicator. For example, illuminating 100 dB indicator 224 and seven sub-range increment indicators indicates a decibel reading of 114 dB, whereas illuminating 120 dB indicator 226 and seven sub-range increment indicators indicates a decibel reading of 134 dB. Thus, the measured decibel level can be determined by a combined reading of the range indicator and the sub-range indicator. Also provided as part of the display is a battery low indicator 230, that illuminates upon the replaceable internal battery dropping below a pre-configured power level.

The control interface includes three user-control buttons that are used to control operation of SPL meter 200. Power button 234 activates the SPL meter by providing electrical power from an internally stored replaceable battery to the SPL circuitry. Range button 236 is used to manually select a monitoring range associated with each of the respective decibel-range indicators 222, 224, 226, as described above. When not in maximum mode, the SPL meter is in a "continuous mode" in which the sub-range indicator continuously displays the currently measured decibel level. Max button 238 is used to place the SPL meter in a maximum mode in which the SPL meter displays the highest SPL reading measured following initiation of maximum mode. While in maximum mode, SPL meter 200 selects a decibel-range indicator, automatically, for each new maximum SPL reading. Once the decibel-range is automatically determined the SPL meter illuminates an appropriate decibel-range indicator and illuminates an appropriate number of sub-range decibel indicators corresponding to the new maximum SPL reading. The SPL meter illuminates maximum indicator light 232 while the SPL meter is operating in maximum mode.

Temporarily mountable SPL meter 200 is ideally suited for monitoring an automobile audio system and/or performing SPL competitions. Integrated bracket 204 allows the SPL meter to be quickly and securely mounted in a consistent manner in any automobile. When mounted, rear sound/pressure hole 206 is consistently placed proximate to the automobile windshield without touching the windshield, as preferred in SPL competitions. Ergonomic display 208 presents SPL reading in a manner that is highly intuitive and easily interpreted. When used to monitor the audio system of a single automobile, the SPL meter can be unobtrusively affixed to an automobile windshield and activated as designed to monitor SPL readings. In competitions, the SPL meter is easily removed and easily remounted in the next competitor's vehicle. The integrated bracket allows the SPL meter to be consistently and repeatably mounted in any vehicle. Thus, the bracket serves as a temporary mounting mechanism that permits the SPL meter to be selectively removed from a vehicle by a user by hand without requiring tools or other involved procedures.

When used in competitions, the SPL meter 200 is typically moved from competition vehicle to competition vehicle while the SPL meter is operating in maximum mode. In this manner, the highest SPL reading of a competitor is automatically compared to the highest SPL reading of the previous competitor. Upon identifying a higher SPL reading, the SPL meter visually updates the new SPL maximum and a new competition frontrunner is declared. Visual decibel-range/sub-range indicators provide competitors with dramatic competition results without requiring competitors to constantly read numeric output and record intermediate competitor SPL meter readings. When used to monitor a single vehicle, SPL meter 200 can be used to measure a maximum SPL reading using maximum mode as described above, or the user can operate the SPL in manual mode in order to view SPL measurement activities within in a single decibel-range. Visual sub-range indicators 228 provide the user with intuitive feedback regarding the decibel levels read within the selected range without requiring the user to constantly read numeric output.

FIGS. 2A–D present an SPL meter 300 with an SPL meter body 302 and an adjustable mounting bracket 304 with suction cups 305 that facilitates stable mounting of the SPL meter to the interior glass and/or any other smooth surface within a vehicle in a manner, described below, capable of withstanding the heavy vibrations typically associated with high decibel acoustic energy.

SPL meter body 302 is essentially a box-shaped housing having a front face 310, a rear face 312, a left face 314, a right face 316 (i.e., two opposing side surfaces), a top face 318 and a bottom face 320. Here again, front face 310 is smaller than top and bottom faces 318 and 320, such that the housing has a relatively small, compact profile when viewed from the front. This overall shape contributes to usefulness of the SPL meter in an automotive context, since, when mounted in the vehicle, the user is presented with a clear, unobtrusive display and control panel that can easily be oriented to face toward the user. Display/control interface 308 is presented upon front face 310 and an adjustable, pivotal mounting bracket 304 is affixed to SPL meter body 302 on left face 314 and right face 316 with adjustable thumb-screws 309. The larger top and bottom surfaces of the SPL meter, relative to the front, rear, and side surfaces, increase the physical stability of the SPL meter by providing a low, stable center of gravity when the SPL meter is mounted with its bottom surface directed downward, thereby assuring that the orientation of the display/control interface also remains stable for easy viewing by the user. SPL meter body 302 further includes a sound/pressure hole (aperture) 306 positioned on front face 310 behind a decorative grating that allows sound to enter the SPL meter body and allows atmospheric pressures to equalize. An access hole, shown in FIG. 2B at 307, allows the SPL meter to be adjusted/calibrated after assembly is complete.

Figure 2C:
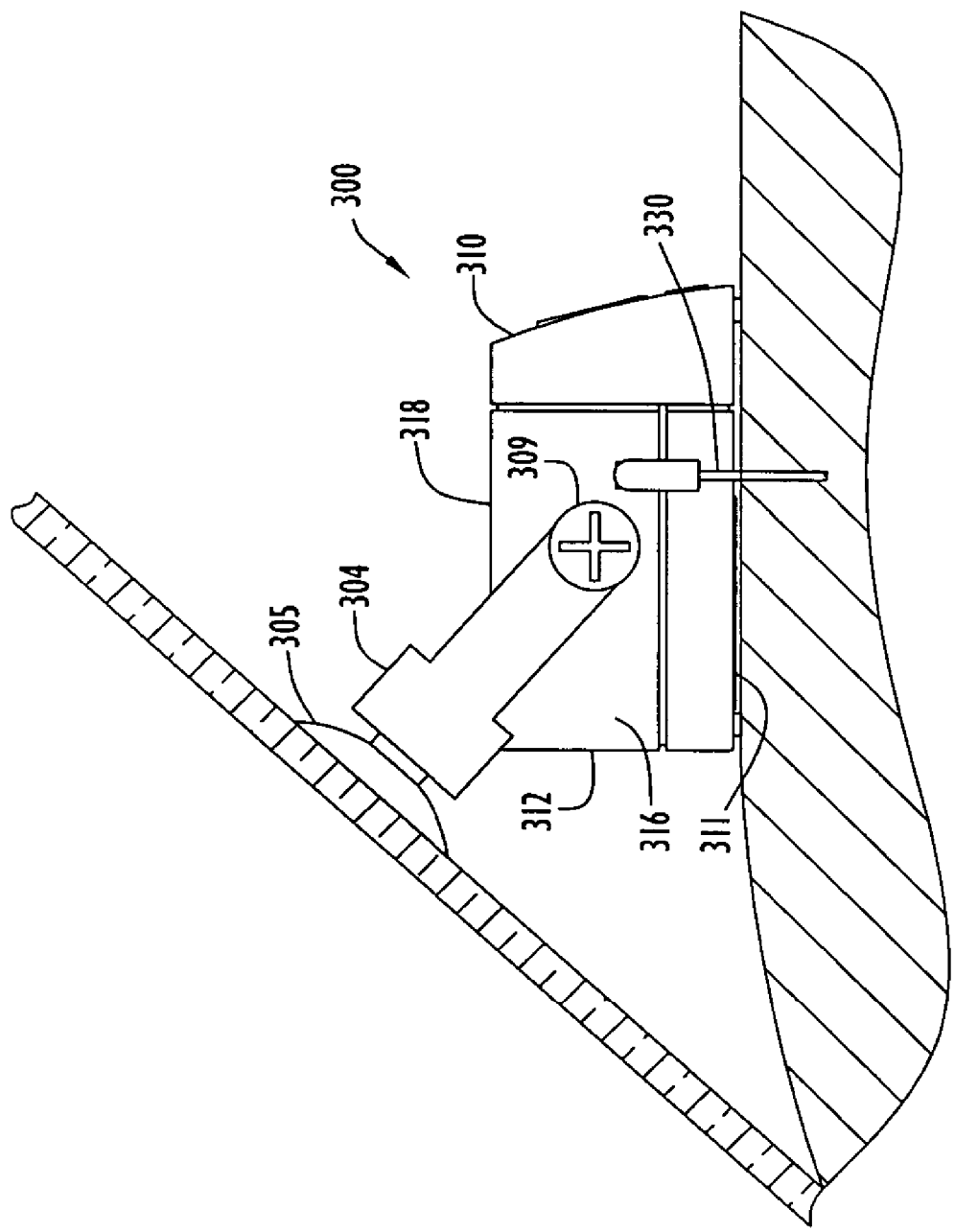
FIG. 2C is a side perspective view, from the same level, of the SPL meter shown in FIG. 2A that shows the SPL meter mounted to an automobile windshield and dashboard.
Figure 2D:
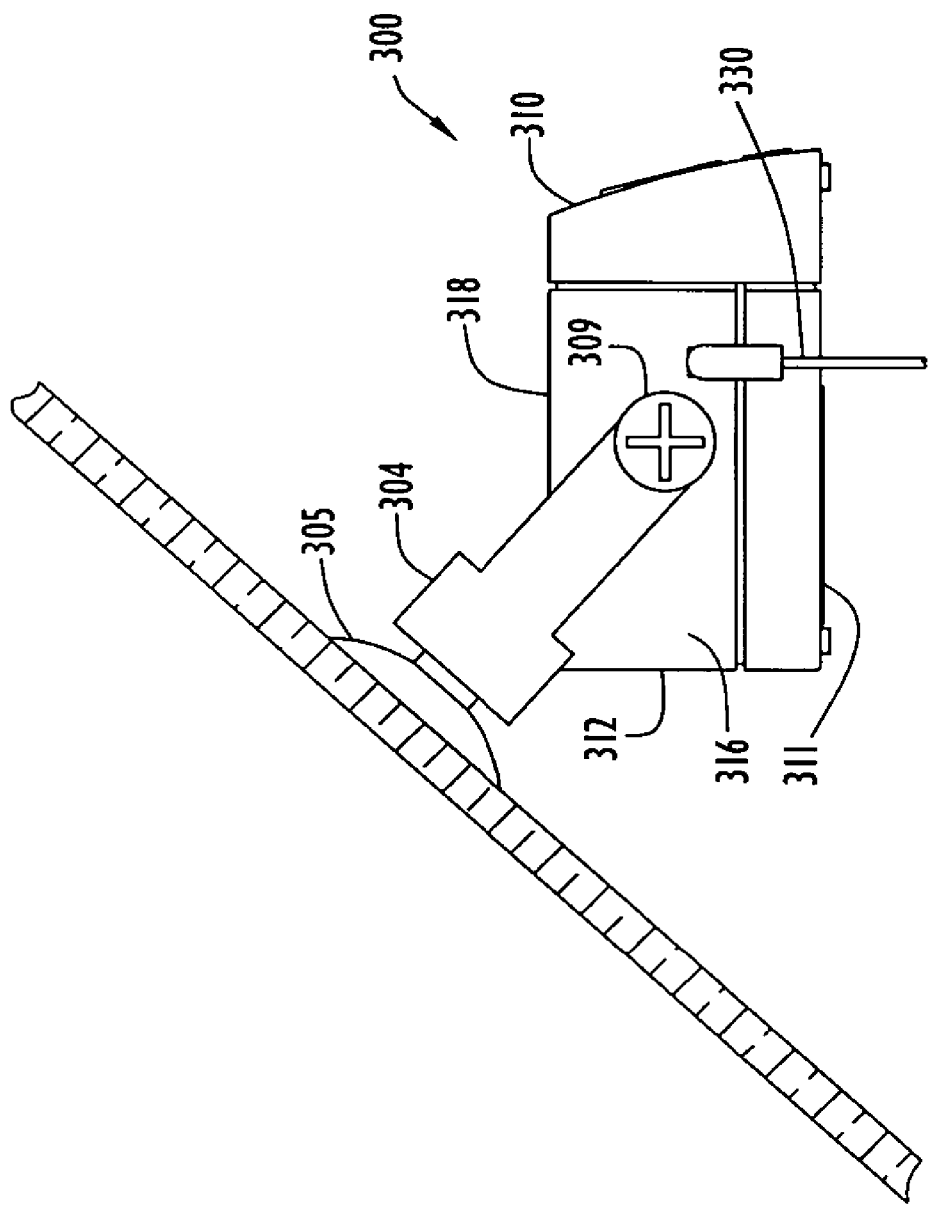
FIG. 2D is a side perspective view, from the same level, of the SPL meter shown in FIG. 2A that shows the SPL meter mounted to an automobile windshield only.

As shown in FIG. 2C, SPL meter 300 can be easily and quickly mounted upon the dashboard of any automobile by loosening adjustable thumb-screws 309, rotating adjustable mounting bracket 304 so that suction cups 305 are positioned to the rear of SPL body 302 and adhering suction cups 305 to the windshield of the vehicle at a location proximate to the location upon the dashboard where the SPL meter is to be placed. In this embodiment, bracket 304 and suction cups 305 serve as the temporary mounting mechanism. In this manner, the SPL meter is positioned with the front face 310 of the SPL meter (and hence the SPL meter display) facing the passenger compartment of the automobile with at least the front edge of bottom face 320 (i.e., the junction of bottom face 320 and front face 310) preferably resting upon the automobile dashboard. To secure the SPL meter in place, the SPL meter is preferably pivoted forward so that pressure is established between at least the front edge of bottom face 320 and the automobile dashboard prior to tightening adjustable thumb-screws 309. Gripping ribs 311, provide increased hold between bottom face 320 and any surface against which bottom face 320 is pressed. Alternatively, SPL meter 300 can be mounted with suction cups 305 to a vehicle windshield without any further stabilizing support, as shown in FIG. 2D. Further, SPL meter 300 can be mounted within a vehicle so that the front face 310 of the SPL meter (and hence the SPL meter display) faces towards an exterior window of the vehicle, allowing the SPL meter display to be viewed from outside the vehicle.

In this manner, the SPL meter can be quickly and securely mounted within any vehicle. Once mounted in such a manner, SPL meter 300 is in an ideal position for use in SPL competitions, as described above, and/or the SPL meter is securely and conveniently placed for use in monitoring an audio system within a single automobile. The SPL meter is removed by loosening thumb-screws 309 to relieve the pressure between the front edge of bottom face 320 and the automobile dashboard and breaking the suction established between suction cups 305 and the automobile windshield. Using the technique described above, the SPL meter can be temporarily mounted within a variety of locations within any vehicle. The SPL meter of the present invention is not limited to being mounted to an automobile dashboard, as described above. Once the SPL meter suction cups 305 are adhered to a smooth surface, SPL meter body 302 can be rotated to establish tension, as described above, with any adjacent surface. In this manner, the SPL meter can be mounted at any location within the automobile to which suction cups 305 are able to adhere.

Similar to the SPL meter described with respect to FIGS. 1A–1C, SPL meter 300 includes a display/control interface 308 with an ergonomic display that is ideal for monitoring an audio system within a single vehicle and/or supporting an SPL competition. Display/control interface 308 includes three decibel-range indicators 322, 324, 326 that indicate a minimum decibel SPL reading of 90 dB, 110 dB and 130 dB, respectively. For example, illumination of 90 dB indicator 322 indicates an SPL reading that is at least 90 dB, but less than 110 dB. Illumination of 110 dB indicator 324 indicates an SPL reading that is at least 110 dB, but less than 130 dB. Illumination of 130 dB indicator 326 indicates an SPL reading that is at least 130 dB, but less than 150 dB.

Further, display/control interface 308 includes a light emitting diode (LED) display 328 that presents the measured SPL reading in a brightly illuminated LED decimal format. Power button 334 activates the SPL meter by providing electrical power to the SPL circuit board. SPL meter 300 is powered via a twelve-volt adapter unit 330 that draws power from any standard automobile cigarette lighter socket and connects to the SPL meter via a power socket 332 located on left face 314 of the SPL meter. Upon powering up, SPL meter 300 initiates an auto-ranging mode in which the SPL meter begins measuring surrounding SPL values. If the currently measured SPL value is below a minimum value that can be displayed via display/control interface 308, a "low" indicator is displayed. Otherwise, the SPL meter automatically selects and illuminates a decibel-range indicator 322, 324, 326 and displays the most recently measured SPL reading upon LED display 328. Range button 336 is used to manually return the SPL meter to auto-ranging mode upon having been set to maximum mode, as described below.

Max button 338 is used to place the SPL meter in a maximum mode in which the SPL meter displays the highest SPL reading measured following initiation of maximum mode. While in maximum mode, SPL meter 300 auto-ranges to select and illuminate an appropriate decibel-range indicator and displays upon LED display 328 the maximum SPL reading measured following activation of maximum mode. The SPL meter identifies the displayed SPL reading as a maximum mode value by illuminating maximum indicator light 340 while the SPL meter is in maximum mode. To support the comparison of maximum SPL readings from different automobiles, upon the operator powering down the SPL meter by pressing power button 334, SPL meter 300 stores the current maximum value in non-volatile electronic memory. Upon, installing the SPL meter in another automobile and powering up the SPL meter by again pressing power button 334, the SPL meter will initiate the SPL meter to maximum mode rather than the default auto-ranging mode, retrieve the stored SPL reading value, and display the retrieved SPL value via LED display 328 as the current maximum value. Storing the maximum SPL value to non-volatile memory at powering down the SPL meter allows the SPL meter to be moved to a new location, and/or removed from a vehicle and installed in another vehicle, without the stored maximum value being affected by intervening events. Such a feature greatly facilitates use of the SPL meter to conduct automotive audio system SPL competitions or any other form of SPL based competition.

Mountable SPL meter 300 is ideally suited for monitoring an automobile audio system and/or performing SPL competitions. Integrated adjustable bracket 304 with locking thumb-screws 309 allow the SPL meter to be quickly and securely mounted in a consistent manner in any automobile. When mounted, pressure sensor 306 is consistently placed proximate to the automobile windshield without touching, as preferred in SPL competitions. Ergonomic display 308 presents SPL reading values in a manner that is highly intuitive and easily understood. When used to monitor the audio system of a single automobile, the SPL meter can be unobtrusively affixed to an automobile windshield and activated as designed to monitor SPL readings. In competitions, the SPL meter is easily removed and easily remounted in the next competitor's vehicle. The adjustable bracket allows the SPL meter to be consistently mounted in a temporary manner in any vehicle.

When used in competitions, the SPL meter 300 is typically moved from competition vehicle to competition vehicle while operating in maximum mode. In this manner, the highest SPL reading of a competitor is automatically stored to non-volatile memory prior to removal of the SPL meter from a competition automobile. Upon installing the SPL meter in a subsequent competition vehicle, the SPL meter retrieves the stored SPL reading value and displays the retrieved SPL value via LED display 328 as the current maximum value. Upon identifying a higher SPL reading, the SPL meter visually updates the new SPL maximum and a new competition frontrunner is declared. When used to monitor a single vehicle, SPL meter 300 can be used to measure a maximum SPL reading using the maximum mode as described above, or the user can operate the SPL in auto-ranging mode to view current SPL measurements.

As described above, SPL meters 200 and 300, described above, include an internal pressure sensor (e.g., a microphone) rather than an externally protruding microphone/pressure sensor typical of conventional SPL meters. Conventional SPL meters typically use an external microphone to avoid high frequency reflections that can introduce errors into an SPL reading. However, an SPL meter of the present invention, which is designed for use in an automotive environment to measure automotive audio system output, low frequencies provide the vast majority of the SPL values that are measured. The low frequencies provide the vast majority of the sound pressure for the following three reasons.

1) During the recording process most recording engineers apply at least a 6 dB boost to the lower frequencies to help overcome both a 50 hz lower limit of most FM radios and to counteract the inevitable road noise that occurs in an automobile or other motorized vehicle while driving.
2) An enclosed vehicle provides a 12-dB/octave boost of low frequencies starting with the frequency whose wavelength matches the longest dimension within the vehicle and increasing at the rate of 12 dB/octave, as frequencies decrease.

3) Consumers of both automobile audio systems and SPL meters, which typically include a large number of 16–24 year old males, typically prefer audio systems with boosted low frequency response.

For the reasons listed above, the SPL meter of the present invention, designed for making automotive SPL measurements and supporting automotive audio system SPL competitions can use an internal pressure sensor without suffering any degradation in performance. To minimize the impact of using an internal pressure sensor, a sound/pressure hole (e.g., FIG. 2A, 306) is included in the SPL housing to allow sound to enter the housing and allow atmospheric pressures to equalize.

Further, the design of the internal pressure sensor itself has been designed for use in making automotive SPL measurements. For example, conventional SPL microphones typically use three or more microphone back plate holes with diameters of 1.5 millimeter, or greater, to improve high frequency response. Such back plate holes are needed to equalize the static or atmospheric pressure within the internal microphone in response to an external altitude and/or barometric change. In the present invention, however, only two microphone/pressure sensor back plate holes are used, each with a diameter of between approximately 0.9 millimeter to 1.3 millimeter in diameter, with a preferable diameter of approximately 1.1 millimeter. The fewer number of holes with smaller diameters provides the atmospheric pressure relief required, yet extends the high frequency response of the SPL meter of the present invention to 16 kHz. Although a high frequency response of 20 kHz would have been desirable, the amount of sound pressure developed at frequencies between 16 kHz and 20 kHz is negligible.

A further characteristic associated with the use of fewer and smaller microphone/pressure sensor back plate holes is that a pressure increase occurs between the diaphragm and the back plate when a large low frequency signal is applied to the diaphragm. This increase in pressure, in combination with the choice in diaphragm material, as described below, keeps the diaphragm from hitting the back plate at sound pressure levels in excess of 150 dB. By preventing the diaphragm material from hitting the microphone/pressure sensor back plate upon the receipt of high decibel acoustic levels, damage to the diaphragm is avoided and the life of the internal microphone/pressure sensor, and the SPL meter as a whole, is greatly extended.

Preferably, the internal pressure sensor is an electric microphone with a permanently applied polarizing voltage. Such a microphone has no need for a phantom power supply thereby reducing overall microphone power consumption. However, power consumption is primarily a concern only with battery operated embodiments of the present invention.

The present invention is not limited to the use of only diaphragm based microphone/pressure sensors. Any transducer capable of being integrated within the SPL meter housing and generating an electric or electromagnetic signal in response to the detection of sound pressure levels may be used.

Further, the preferred diaphragm material used within the internal microphone/pressure sensor of the present invention is a polytetrafluoroethylene (PTFE) film. Preferably, the PTFE film has a thickness of between approximately 0.005 millimeter and approximately 0.025 millimeter, with a preferred thickness of 0.0125 millimeter. A commercially available PTFE film suitable for use in the SPL meter internal microphone/pressure sensor of the present invention is produced by Dupont Corporation and marketed as Teflon® film product FEP 50A. Conventional SPL meter microphones/pressure sensors use lighter diaphragm material, as thin as 0.00254 millimeter, in order to improve SPL meter frequency and transient responses. However, use of a heavy, resilient diaphragm, as described above, supports the frequency range of up to 16 KHz targeted by the SPL meter of the present invention, as described above, and greatly increases microphone/pressure sensor durability and hence SPL meter durability and performance under extreme temperature/humidity conditions as well as durability in response to prolonged and repeated exposure to high decibel levels.

The preferred microphone/pressure sensor diaphragm material, Dupont FEP 50A film has a continuous operating temperature range of from approximately −400 to +400 degrees F., a moisture absorption specification of less than 0.01% when totally immersed in water, mechanical properties that include tensile strength of 3000 psi, stress to produce 5% strain 1700 psi, an initial tear strength of 10.2 lbf and is practically inert to outdoor exposure with no measurable change in tensile strength after twenty years of outdoor exposure (based upon Dupont long term durability tests performed in the state of Florida). Although use of the PTFE film, as describe above, is preferred, such a diaphragm material is merely an exemplary embodiment. The present invention is not limited to the use of any specific microphone/pressure sensor diaphragm material.

In addition to the internal microphone/pressure sensor diaphragm and base plate hole characteristics described above, the internal microphone/pressure sensor used within the SPL meter of the present invention preferably includes a non-conducting gasket between the pressure sensor diaphragm material and the pressure sensor back plate, approximately 0.1 millimeter and 0.2 millimeter in thickness, with a preferred gasket thickness of approximately 0.14 millimeter. Such an approach provides sufficient microphone/pressure sensor excursion capability but results in reduced microphone/pressure sensor sensitivity. However, such losses in sensitivity can be substantially negated by tuning the SPL meter preamplifier and controller responses to compensate for the reduced microphone/pressure sensor sensitivity.

By integrating the materials and characteristics described above, an SPL meter microphone/pressure sensor is produced that is small, linear in its response, and capable of handling prolonged exposure to decibel levels as high as 150 dB without damage. Further, the resulting microphone/pressure sensor is capable of withstanding the abuse of the environmental extremes consistent with automotive use.

Figure 3:
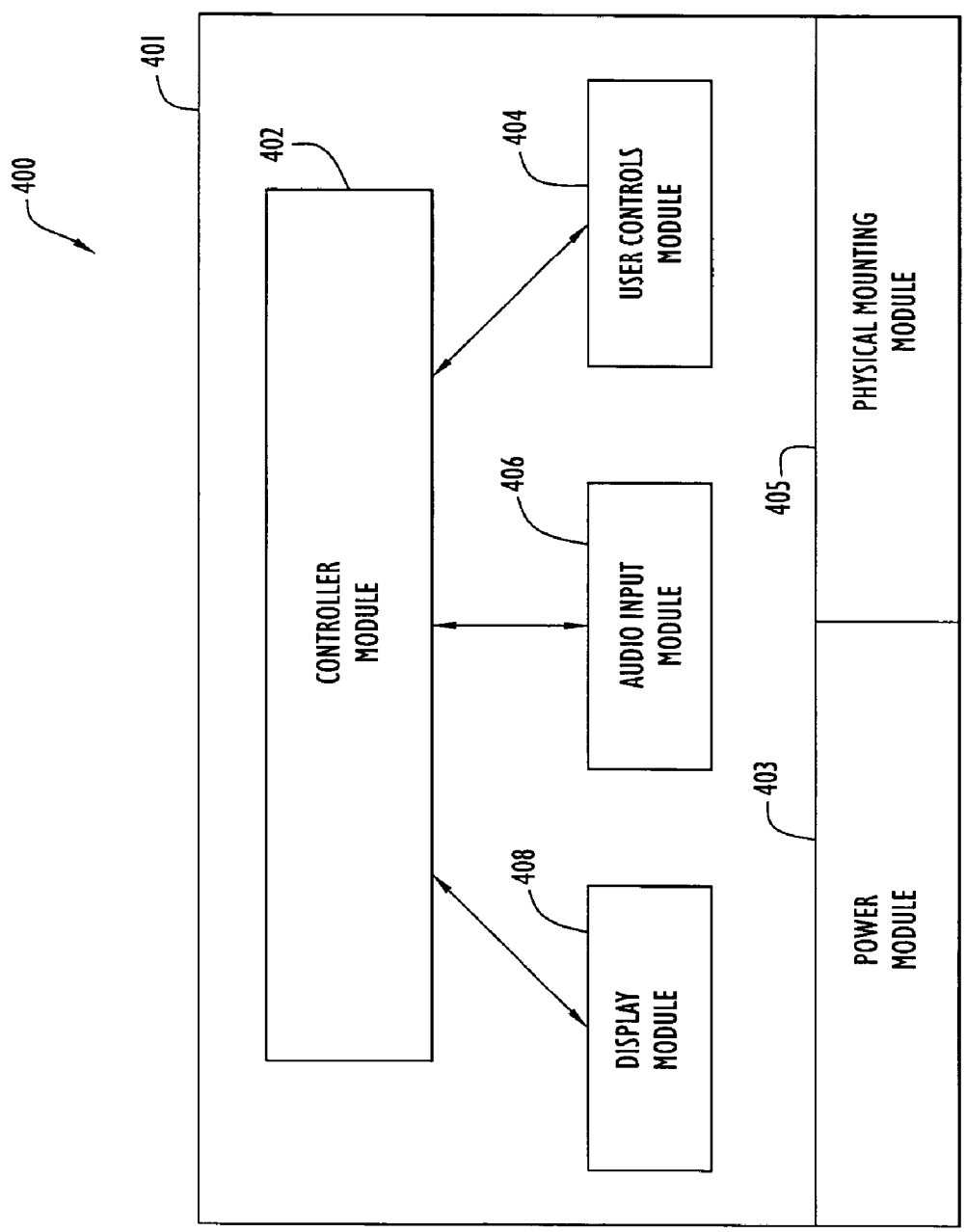
FIG. 3 is a block diagram of a representative SPL meter in accordance with an exemplary embodiment of the present invention.

FIG. 3 is a block diagram that depicts a non-limiting, representative embodiment of an SPL meter in accordance with the present invention. A shown in FIG. 3, an SPL meter 400 includes a SPL body 401 that houses the operational components/circuitry of the SPL meter, a power module 403 that provides electrical power to SPL meter circuitry and/or processors contained within SPL body 401 and an integrated physical mounting module 405 that is used to securely mount SPL meter body 401 within the interior of an automobile.

Preferably, the SPL meter of the present invention executes the majority of SPL functionality in the digital domain to reduce the number of internal electronic components and to minimize errors caused by the non-linear characteristics of more common analog devices. In this manner, software executed within a programmable controller can be used to correct identified problems rather than numerous analog electronic components. For example, an 8-bit RISC micro-controller within the SPL circuitry can be programmed for multiple processing purposes. Such a digital, central process based design increases design flexibility and reduces the number of discrete components within the SPL meter's internal circuitry, thereby reducing SPL meter production costs as well as reducing the required size of the SPL meter body.

Referring again to FIG. 3, SPL meter body 401 houses SPL meter circuitry and/or processors that implement SPL meter operational capabilities. Power module 403 provides electrical power from an identified power source to SPL meter circuitry and/or processors within the SPL meter body 401. As indicated with respect to FIGS. 1A–C and FIGS. 2A–D, such a power source can be an internal battery or an external power source connected to the SPL meter body via a cable. The SPL meter circuitry and/or processors within SPL meter body 401 implement a controller module 402 that interfaces with a user-controls module 404, an audio input module 406 and a display module 408 to provide SPL meter operational capabilities, as described above.

Controller module 402 receives user input controls via user-controls module 404 that monitors user input buttons and reports button status changes to the controller module. For example, depending upon the SPL meter embodiment, the user-controls module may report such user input as power-up/ power down, selection of a decibel-range for display, and/or selection of an operational mode in response to a user pressing at least one button as described above with respect to FIGS. 1A–C and FIGS. 2A–D.

Controller module 402 receives audio input from an internal SPL pressure sensor, as described above, via an audio input module 406 that samples and digitizes analog input received from the imbedded SPL pressure sensor and presents the digitized information to the controller module for further processing. Upon obtaining/determining a digitized SPL value, controller module 402 processes the value based upon a current mode of operation. For example, in an SPL meter that supports a manual ranging mode, as described above with respect to FIGS. 1A–C, controller module 402 controls display module 408 to illuminate an LED associated with the current selected decibel-range and controller module 402 further controls display module 408 to illuminate LED(s) associated with a remainder value determined based upon the difference between the measured SPL reading and the current selected decibel-range. By way of a second example, in an SPL meter capable of determining a decibel-range automatically (i.e., auto-ranging mode), as described above with respect to FIGS. 2A–D, controller module 402 determines a current decibel-range based upon the magnitude of the SPL reading and further controls display module 408 to illuminate the LED(s) associated with the determined decibel-range and to illuminate digital display LED(s) associated with the measured SPL reading. By way of a third example, in an SPL meter that supports a maximum mode, as described above with respect to FIGS. 2A–D, controller module 402 determines whether the current SPL reading exceeds a previously stored maximum SPL reading and if so, stores the current SPL reading as the new SPL maximum and interfaces with display module 408 to display the new maximum SPL value and associated decibel range indicator.

Display module 408 controls an ergonomic display used to display SPL decibel-ranges, SPL sub-ranges, and/or SPL readings via the ergonomic display. Preferably, SPL decibel-ranges, SPL sub-ranges and SPL reading values are displayed using bright LED indicators arranged in a combination of decibel-range indicators, decibel sub-range indicators and/or numeric LED displays, as described with respect to FIGS. 1A–C and FIGS. 2A–D, above.

Figure 4A:
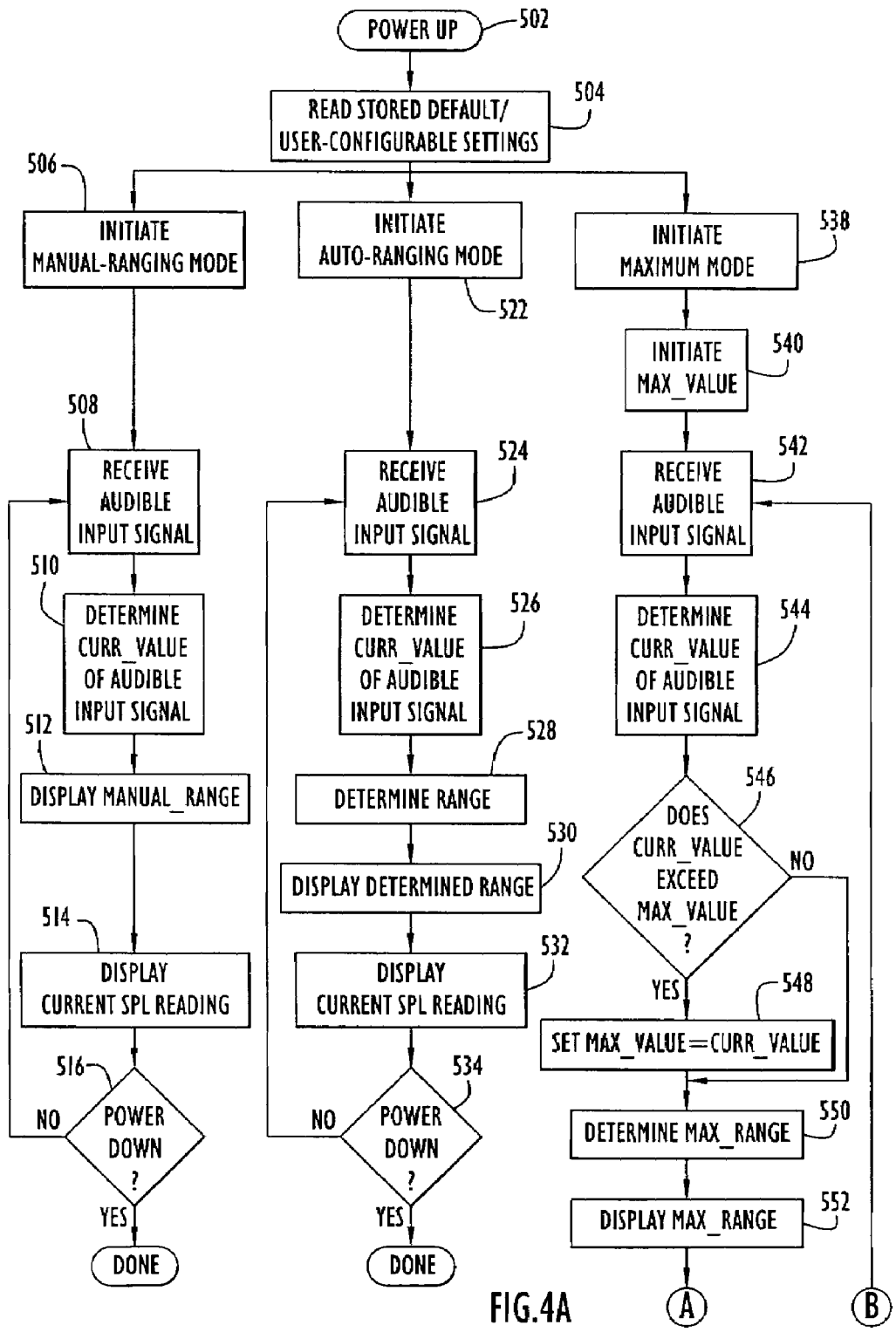
FIGS. 4A–B is a process flow diagram depicting operating modes of an SPL meter in accordance with an exemplary embodiment of the present invention
Figure 4B:
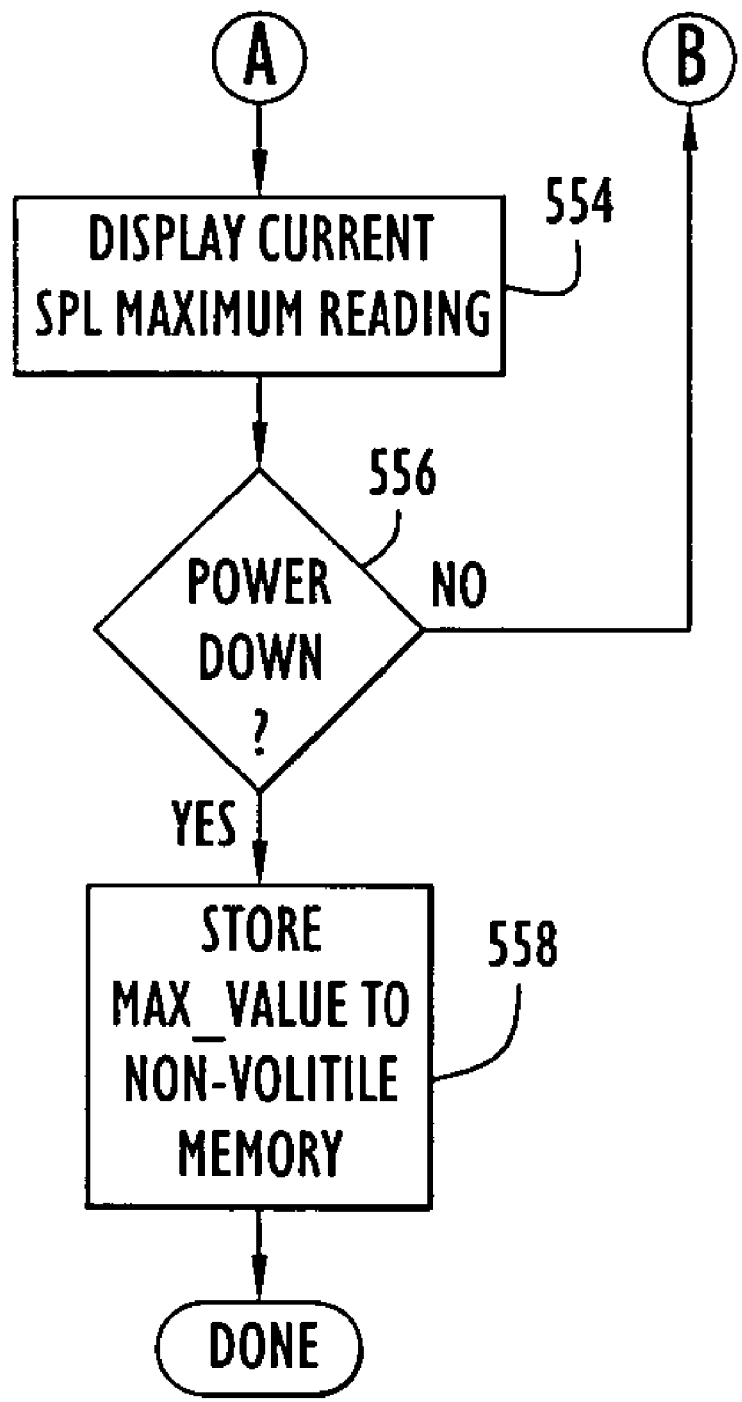

FIGS. 4A–B is a process flow diagram depicting exemplary operating modes of an SPL meter in accordance with an exemplary embodiment of the present invention. As shown in FIGS. 4A–B, upon powering up, at step 502, the SPL meter reads, at step 504, a set of default and/or user configurable settings that are used to determine an initial operating mode of the SPL meter.

If the SPL meter initiates, based upon the stored default or user configured parameters, at step 506, a manual-ranging mode, the SPL meter proceeds to receive, at step 508, audible input signals and to determine, at step 510, a current SPL reading based upon the audible input signal, as described above. Next, the SPL meter displays, at step 512, a default or manually selected decibel-range setting and displays, at step 514, the value of the current SPL reading to the extent possible given the current value of the decibel-range setting. If the user-controls module indicates, at step 516, that a power-down request has been received, the SPL terminates processing. However, if the user-controls module indicates, at step 516, that a power-down request has not been received, processing proceeds to step 508 and a new SPL reading is determined and displayed based upon the received audible input signal, as described above.

If the SPL meter initiates, based upon stored default or user configured parameters, at step 522, an automatic-ranging mode, the SPL meter proceeds to receive, at step 524, audible input signals and to determine, at step 526, a current SPL reading based upon a received audible input signal, as described above. Next, at step 528, the SPL meter automatically determines a current decibel-range by locating the highest decibel-range indicator supported the SPL meter display that is less than the current SPL reading value. At step 530, the SPL meter displays the currently selected automatic decibel-range setting and displays, at step 532, the value of the current SPL reading. If the user-controls module indicates, at step 534, that a power-down request has been received, the SPL terminates processing. However, if the user-controls module indicates, at step 534, that a power-down request has not been received, processing proceeds to step 524 and a new SPL reading is determined and displayed, as described above, based upon the received audible input signal.

If the SPL meter initiates, based upon stored user configured parameters, at step 538, maximum mode operation, the SPL meter initializes, at step 540, the current maximum SPL reading value based upon the value of the maximum SPL reading value stored prior to powering down the previous maximum mode session. Once initialized, the SPL meter proceeds to receive, at step 542, audible input signals and to determine, at step 544, a current SPL reading based upon the audible input signal, as described above. If the SPL meter determines, at step 546, that the current SPL reading exceeds the stored maximum SPL reading, the controller module stores, at step 548, the current SPL value as the new maximum SPL value. However, if the SPL meter determines, at step 546, that the current SPL reading does not exceed the stored maximum SPL reading, the controller module discards the current SPL value and the stored maximum SPL value remains the same. Next, at step 550, the SPL meter automatically determines a current decibel-range by locating the highest decibel-range indicator supported the SPL meter display that is less than the current maximum SPL value. At step 552, the SPL meter displays the currently selected decibel-range setting and displays, at step 554, the current SPL maximum value. If the user-controls module indicates, at step 556, that a power-down request has been received, the SPL stores, at step 558, the current maximum SPL value to non-volatile storage and terminates processing. However, if the user-controls module indicates, at step 556, that a power-down request has not been received, processing proceeds to step 542 and a new SPL reading is determined and compared to the current SPL maximum, as described above.

In the process flows described above, an SPL meter typically displays the currently selected range by illuminating a corresponding decibel-range indicator LED and displays the current SPL reading as either a digital value (as in FIGS. 2A–D) depicting the entire SPL reading or a series of sub-range LEDs that correlate to the current SPL reading minus the value of the currently selected range (as in FIGS. 1A–C). However, the present invention is not limited to these exemplary display embodiments.

In manual-ranging mode, the operator is responsible for selecting an appropriate decibel-range so that the sub-range values illuminated present useful information to the operator. If the user selects a decibel-range that is too low, and SPL meter is configured to display the current SPL reading via a series of sub-range LEDs that correlate to the current SPL reading minus the value of the currently selected decibel-range (as in FIGS. 1A–C), the SPL meter will illuminate all LEDs in the sub-range display area, thus limiting the amount of useful information presented to the user. Conversely, if the user selects a decibel-range that is too high, the same SPL meter will not illuminate any sub-range LEDs, thus limiting the amount of useful information presented to the user. In manual mode, such a condition is corrected by the user selecting a more appropriate decibel-range via the controls module user buttons, as described above.

As demonstrated by the exemplary embodiments described above with respect to FIGS. 1A–C and FIGS. 2A–D, the present invention provides an SPL meter that is temporarily, or selectively removably, mountable. However, embodiments presented are exemplary only. The present invention includes any SPL meter that can be selectively mounted and optionally removed from anywhere within the interior of an automobile, including but not limited to SPL meters that are temporarily, or selectively removably, mounted using loop/hook fastening materials, magnetic fastening materials, adhesive materials and/or a fixed physical base that is affixed in any manner within the interior of the vehicle, etc. Preferably, the selectively removably mountable mechanism/technique used to temporarily mount and stabilize the SPL meter within the interior of the automobile results in the SPL meter display facing towards the interior of the vehicle, easily viewed by individuals seated within the vehicle. Selectively removably mountable mechanisms/techniques that do not require permanently mounting or gluing a fixed physical base/platform and/or adhesive to the interior of the vehicle are preferred.

Figure 5:
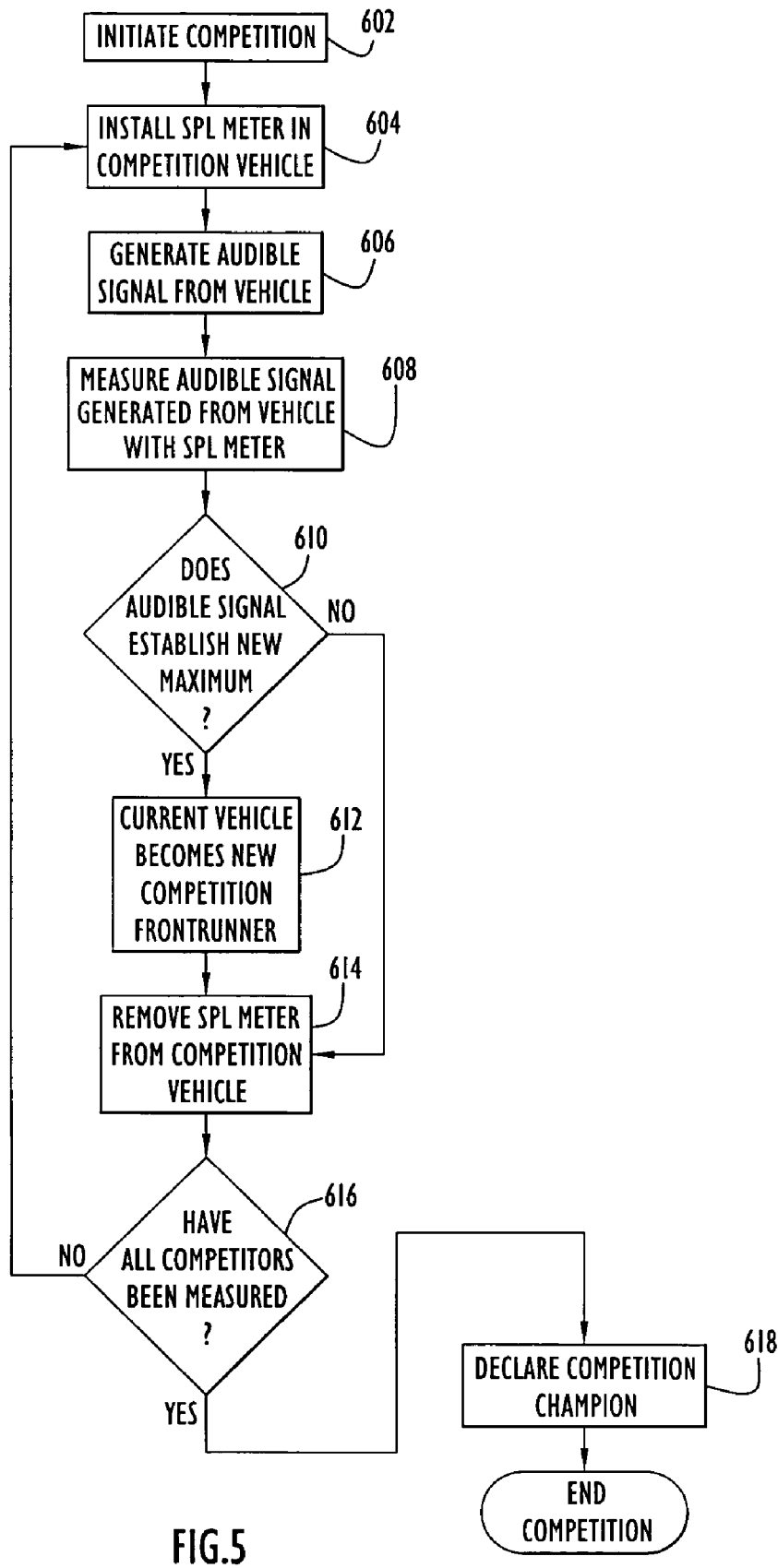
FIG. 5 is a process flow diagram depicting use of an SPL meter in accordance with an exemplary embodiment of the present invention to conduct an automotive audio sound pressure level (SPL) competition.

FIG. 5, is a process flow diagram depicting activities associated with conducting an automotive audio sound pressure level (SPL) competition with an SPL meter in accordance with the teachings of the present invention. As shown in FIG. 5, upon initiating a competition, at step 602, an SPL meter is installed, at step 604, in a competition vehicle and the competition vehicle audio system is activated, at step 606, to generate an audible signal. The audible signal generated by the competition vehicle audio system is measured, at step 608, by the SPL meter to obtain a maximum SPL reading for the competition vehicle. The competition judges compare the measured SPL reading to SPL readings previously recorded from other competition vehicles to determine, at step 610, whether the reading establishes a new competition maximum. If a new competition maximum value is established, at step 610, the current competition vehicle is named, at step 612, the new SPL competition frontrunner and the SPL meter is removed, at step 614 from the competition vehicle. If it is determined, at step 610, that the measured SPL reading does not establish a new competition maximum, processing proceeds to step 614 and the SPL meter is removed from the competition vehicle. If it is determined, at step 616, that additional competitors have yet to be measured, processing resumes at step 604 and the SPL meter is installed in the next competition vehicle. However, if it is determined, at step 616, that all competitors have been measured, the frontrunner is declared, at step 618, the competition champion and the competition is ended.

Any of the SPL meter embodiments, described above, may be used in the above process flow to obtain SPL readings in support of an SPL competition. However, if an SPL meter embodiment is used in a maximum mode that stores the maximum SPL reading to memory upon power-down (as described with respect to FIGS. 4A–B, steps 538–558), a few additional steps are required to initialize a baseline maximum value upon starting the competition and to save newly established maximum SPL readings. For example, with respect to FIG. 5, upon initiating the competition, at step 602, but prior to installing the SPL meter in a competition vehicle, at step 604, the SPL meter would first be initialized to an initial baseline maximum reading. A baseline maximum reading is established by starting the SPL meter, manually configuring the SPL meter to maximum mode (by pressing the MAX button after the meter has initialized), establishing an initial baseline maximum by generating a sound slightly above the levels that can be measured with the SPL meter (e.g. 92 dB), and powering down the SPL meter to store the baseline maximum to non-volatile memory. Further, immediately after installing the SPL meter in a competition vehicle, the SPL meter is powered-up, thereby returning the SPL meter to maximum mode and restoring the previously save SPL maximum reading. In addition, prior to removing the SPL meter from a competition vehicle, at step 114, the SPL meter is powered down in order to save the current maximum SPL reading to non-volatile memory.

Although additional steps are performed to use an SPL meter that supports maximum mode and storage of maximum values to non-volatile memory upon powering down, several advantages are achieved. For example, if battery-operated, the SPL meter is able to conserve power while being transferred from competition vehicle to competition vehicle. Further, extraneous noises during the transfer of the SPL meter from one vehicle to another cannot affect the outcome of the competition. In addition, should it be necessary to pause the competition for several minutes, hours, or even days, the most current maximum value is preserved.

From the foregoing description it will be appreciated that the present invention includes a novel automotive SPL meter for use in measuring and comparing audio system sound pressure levels within an automobile or other motorized vehicle. Further, it will be appreciated that the embodiments described above and illustrated in the drawings represent only a few of the many ways of implementing a zone detection system. It is to be understood that various functions of the SPL meter may be distributed in any manner among any quantity (e.g., one or more) of hardware and/or software modules or units, and/or processing systems or circuitry. The software and/or processes described above and illustrated in the flow charts and diagrams may be modified in any manner that accomplishes the functions described herein.

Having described preferred embodiments of an SPL meter, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in their ordinary and accustomed manner only, unless expressly defined differently herein, and not for purposes of limitation.

What is claimed is:

1. An automotive sound pressure level (SPL) meter that is temporarily mountable in a motor vehicle, comprising:
    an SPL meter including a housing, a pressure sensor, a mode selector input device, and a display, wherein the housing includes opposing top and bottom surfaces, two opposing side surfaces, a front face and a rear face opposing the front face, the pressure sensor is contained within the housing, the display includes a digital display indicating a measured decibel level, and the SPL meter is configured to measure sound pressure levels within a motor vehicle; and
    a temporary mounting mechanism comprising a bracket mounted to the housing of the SPL meter, wherein the bracket pivots relative to the housing, and wherein the temporary mounting mechanism affixes the SPL meter to a surface within the motor vehicle, such that the SPL meter is selectively removable from the motor vehicle.

2. The automotive SPL meter of claim 1, wherein the pressure sensor includes a diaphragm comprising polytetrafluoroethylene (PTFE) film.

3. The automotive SPL meter of claim 1, wherein the pressure sensor includes a diaphragm of thickness between approximately 0.005 millimeters and approximately 0.025 millimeters.

4. The automotive SPL meter of claim 1, wherein the pressure sensor includes a diaphragm of a material with physical characteristics that are substantially insensitive to at least one of temperature, humidity, and high decibel acoustic energy.

5. The automotive SPL meter of claim 1, wherein the pressure sensor includes a back plate with no more that two back plate holes.

6. The automotive SPL meter of claim 1, wherein the housing of the SPL meter includes a single sound/pressure hole for receiving acoustic energy detectable by the pressure sensor.

7. The automotive SPL meter of claim 1, wherein the pressure sensor includes a back plate with a back plate hole of a diameter of between approximately 0.9 to 1.3 millimeters.

8. The automotive SPL meter of claim 1, wherein the pressure sensor includes a non-conducting gasket between a pressure sensor diaphragm and a pressure sensor back plate, wherein the non-conducting gasket has a thickness between approximately 0.1 millimeters and 0.2 millimeters.

9. The automotive SPL meter of claim 1, wherein the pressure sensor is a microphone.

10. The automotive SPL meter of claim 1, wherein the temporary mounting mechanism comprises at least one suction cup coupled to the housing.

11. The automotive SPL meter of claim 10, wherein the at least one suction cup is mounted on the bracket.

12. The automotive SPL meter of claim 1, wherein the display and the mode selector input device are disposed on the front face.

13. The automotive SPL meter of claim 12, wherein the front face is smaller than the top and bottom faces.

14. The automotive SPL meter of claim 12, wherein the top and bottom surfaces are larger than the two opposing side surfaces and the front and rear faces.

15. The automotive SPL meter of claim 12, wherein the pressure sensor receives acoustic energy through an aperture in the front face.

16. The automotive SPL meter of claim 12, wherein the pressure sensor receives acoustic energy through an aperture in the rear face.

17. The automotive SPL meter of claim 12, wherein the temporary mounting mechanism comprises a bracket pivotally coupled to the two opposing side surfaces of the housing.

18. The automotive SPL meter of claim 12, wherein the temporary mounting mechanism is oriented relative to the housing such that, when the SPL meter is mounted to the surface within the motor vehicle, the front face of the housing is visible to an occupant seated in the motor vehicle.

19. The automotive SPL meter of claim 1, wherein the mode selector input device includes a maximum mode selector that controls the display to indicate a maximum measured decibel level.

20. The automotive SPL meter of claim 19, wherein the SPL meter stores the maximum measured decibel level in response to turning off power to the SPL meter.

21. The automotive SPL meter of claim 1, wherein the mode selector input device includes a continuous mode selector that controls the display to continuously indicate a current measured decibel level.

22. The automotive SPL meter of claim 1, wherein the temporary mounting mechanism comprises an integrated mounting bracket that attaches to a mounting base affixed to the interior of the motor vehicle.

23. An automotive sound pressure level (SPL) meter that is temporarily mountable in a motor vehicle, comprising:
    an SPL meter including a housing, a pressure sensor, a mode selector input device, and a display, wherein the housing includes opposing top and bottom surfaces, two opposing side surfaces, a front face and a rear face opposing the front face, the pressure sensor is contained within the housing, the display includes a range indicator and a sub-range indicator, wherein a combined reading of the range indicator and the sub-range indicator indicates a measured decibel level, and the SPL meter is configured to measure sound pressure levels within a motor vehicle; and
    a temporary mounting mechanism comprising a non-pivoting, clip-like bracket coupled to the housing, wherein the clip-like bracket is suitable for temporarily mounting the SPL meter on a sun visor within the motor vehicle.

24. An automotive sound pressure level (SPL) meter that is temporarily mountable in a motor vehicle, comprising:
    an SPL meter configured to measure sound pressure levels within a motor vehicle, the SPL meter including a housing, a pressure sensor, a mode selector input device, and a display that includes a range indicator and a sub-range indicator, wherein the range indicator indicates which one of a plurality of sub-ranges of decibels is being displayed by the sub-range indicator, and wherein the sub-range indicator comprises a series of indicators, wherein the measured decibel level within the sub-range is indicated by illumination of a number of consecutive indicators; and a temporary mounting mechanism coupled to the housing of the SPL meter, wherein the temporary mounting mechanism affixes the SPL meter to a surface within the motor vehicle, such that the SPL meter is selectively removable from the motor vehicle.

25. An automotive sound pressure level (SPL) meter that is temporarily mountable in a motor vehicle, comprising:

an SPL meter including a housing, a pressure sensor, a mode selector input device, and a display, wherein the housing includes opposing top and bottom surfaces, two opposing side surfaces, a front face and a rear face opposing the front face, the pressure sensor is contained within the housing, the display includes a digital display indicating a measured decibel level, and the SPL meter is configured to measure sound pressure levels within a motor vehicle; and a temporary mounting mechanism coupled to the housing of the SPL meter, wherein the temporary mounting mechanism affixes the SPL meter to a surface within the motor vehicle, such that the SPL meter is selectively removable from the motor vehicle.

26. A method of measuring a sound pressure level (SPL) within a motor vehicle by operating an SPL meter having a display, a pressure sensor, and a housing having opposing top and bottom surfaces, two opposing side surfaces, a front face, and a rear face opposing the front face, the pressure sensor being contained within the housing, the method comprising:

(a) temporarily mounting the SPL meter to a surface within the motor vehicle via a temporary mounting mechanism comprising a clip-like bracket coupled to the SPL meter;

(b) measuring within the motor vehicle an acoustic energy received by the pressure sensor through at least one aperture in the housing to obtain a measured SPL reading; and (c) digitally displaying the measured SPL reading on a display of the SPL meter.

27. A method of measuring a maximum sound pressure level (SPL) reading from among a plurality of SPL readings, wherein each of the plurality of SPL readings is measured from within one of a plurality of motor vehicles, the method comprising:

(a) temporarily mounting the SPL meter to a surface within the motor vehicle via a temporary mounting mechanism coupled to the SPL meter;

(b) measuring an acoustic energy within the motor vehicle to obtain a measured SPL reading;

(c) displaying the measured SPL reading on a display of the SPL meter;

(d) comparing the measured SPL reading to a current maximum SPL reading stored within the SPL meter; and (e) replacing the current maximum SPL reading with the measured SPL reading upon determining that the measured SPL reading exceeds the current maximum SPL reading.

28. The method of claim 27, further comprising:

(f) storing the current maximum SPL reading in non-volatile memory.

29. The method of claim 28, wherein (f) further includes storing the current maximum SPL reading in non-volatile memory in response to an operator initiating a power down.

30. A method of measuring a sound pressure level (SPL) within a motor vehicle by operating an SPL meter having a display, a pressure sensor, and a housing having opposing top and bottom surfaces, two opposing side surfaces, a front face, and a rear face opposing the front face, the pressure sensor being contained within the housing, the method comprising:

(a) temporarily mounting the SPL meter to a surface within the motor vehicle via a temporary mounting mechanism comprising a bracket pivotally coupled to the SPL meter;

(b) measuring within the motor vehicle an acoustic energy received by the pressure sensor through at least one aperture in the housing to obtain a measured SPL reading; and (c) digitally displaying the measured SPL reading on a display of the SPL meter.

31. The method of claim 30, wherein, upon mounting an SPL meter within the motor vehicle, the display of the SPL meter is oriented toward an occupant seared within the motor vehicle.

32. The method of claim 30, wherein, upon mounting an SPL meter within the motor vehicle, the display of the SPL meter is oriented toward at least one exterior window of the motor vehicle.

33. The method of claim 30, wherein (b) includes detecting a contribution to the measured sound pressure level from an acoustic energy frequency as high as 16 kHz.

34. The method of claim 30, wherein (b) further includes measuring acoustic energy with a microphone-based transducer.

35. The method of claim 30, wherein (c) further includes displaying the measured SPL reading as a series of illuminated indicators, wherein each illuminated indicator represents a specific number of decibels.

36. The method of claim 35, wherein (c) further includes displaying the measured SPL reading as an illuminated decibel range indicator and a series of illuminated decibel sub-range indicators.

37. The method of claim 30, wherein the SPL meter is temporarily mounted to the surface within the motor vehicle with suction cups.

38. The method of claim 30, wherein the front face is smaller than the top and bottom surfaces and the two opposing side surfaces, wherein (c) includes displaying the measured SPL reading on the display on the front face.

* * * * *

UNITED STATES PATENT AND TRADEMARK OFFICE
CERTIFICATE OF CORRECTION

PATENT NO.         : 7,021,142 B2
APPLICATION NO. : 10/695771
DATED              : April 4, 2006
INVENTOR(S)       : Roark It is certified that error appears in the above-identified patent and that said Letters Patent is hereby corrected as shown below:

Title Page, Please insert
(73) Assignee:

Sabrina Nelson Roark, Clarksville, Tennessee

Signed and Sealed this

Twenty-second Day of May, 2007

JON W. DUDAS
*Director of the United States Patent and Trademark Office*